US011091135B2

(12) United States Patent
Cho et al.

(10) Patent No.: US 11,091,135 B2
(45) Date of Patent: Aug. 17, 2021

(54) ELECTRONIC CONTROL APPARATUS AND METHOD OF CONTROLLING THE SAME

(71) Applicant: MANDO CORPORATION, Pyeongtaek-si (KR)

(72) Inventors: Kyung-Ran Cho, Seoul (KR); Mo-Ran Yang, Pyeongtaek-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 248 days.

(21) Appl. No.: 16/434,680

(22) Filed: Jun. 7, 2019

(65) Prior Publication Data

US 2019/0375384 A1 Dec. 12, 2019

(30) Foreign Application Priority Data

Jun. 7, 2018 (KR) .......................... 10-2018-0065426
Mar. 18, 2019 (KR) .......................... 10-2019-0030725

(51) Int. Cl.
*B60T 8/171* (2006.01)
*G01P 3/44* (2006.01)
*G07C 5/08* (2006.01)

(52) U.S. Cl.
CPC ................ *B60T 8/171* (2013.01); *G01P 3/44* (2013.01); *G07C 5/08* (2013.01); *B60T 2240/00* (2013.01);
(Continued)

(58) Field of Classification Search
CPC ............ B60T 2240/00; B60T 2270/10; B60T 2270/413; B60T 2270/416; B60T 8/171; B60T 8/885; G01P 3/44; G07C 5/08
See application file for complete search history.

(56) References Cited

U.S. PATENT DOCUMENTS 4,499,543 A * 2/1985 Matsuda ................. B60T 8/885
303/122.06
4,546,437 A * 10/1985 Bleckmann ............. B60T 8/885
303/122.05
(Continued)

FOREIGN PATENT DOCUMENTS

DE    10 2014 221 901 A1    4/2016
KR    10-2013-0004918 A     1/2013
(Continued)

OTHER PUBLICATIONS

The extended European Search Report dated Oct. 8, 2019 in connection with the counterpart European Patent Application No. 19179178.9.
(Continued)

*Primary Examiner* — Tyler J Lee
(74) *Attorney, Agent, or Firm* — Hauptman Ham, LLP

(57) ABSTRACT

An electronic control capable of processing wheel speed information is disclosed. An electronic control apparatus according to an embodiment of the disclosure includes: a first electronic control apparatus including a first signal processor configured to process a signal of a wheel speed sensor; and a second electronic control apparatus which includes a second signal processor configured to process the signal of the wheel speed sensor, a first switching device electrically provided between the wheel speed sensor and the first signal processor, configured to allow or block the signal of the wheel speed sensor to be transmitted to the first signal processor, and a second switching device electrically provided between the wheel speed sensor and the second signal processor, configured to allow or block the signal of the wheel speed sensor to be transmitted to the second signal processor.

20 Claims, 14 Drawing Sheets

(52) U.S. Cl.
CPC ..... *B60T 2270/10* (2013.01); *B60T 2270/416* (2013.01)

(56) References Cited

U.S. PATENT DOCUMENTS

| | | | |
|---|---|---|---|
| 4,656,588 A | 4/1987 | Kubo | |
| 4,818,037 A * | 4/1989 | McEnnan | B60T 8/171 303/183 |
| 4,980,832 A * | 12/1990 | Matsuda | B60T 8/885 303/122.06 |
| 5,648,759 A * | 7/1997 | Miller | B60T 8/404 340/660 |
| 5,897,601 A * | 4/1999 | Suzuki | B60K 23/04 701/78 |
| 2005/0228568 A1* | 10/2005 | Hack | B60T 8/322 701/70 |
| 2017/0008335 A1* | 1/2017 | Howard | B60B 15/14 |

FOREIGN PATENT DOCUMENTS

| | | | |
|---|---|---|---|
| KR | 10-2015-0062426 A | 6/2015 |
| KR | 10-1691445 B1 | 1/2017 |
| KR | 10-1714271 B1 | 3/2017 |

OTHER PUBLICATIONS

Korean Decision to Grant Patent dated Nov. 14, 2019, in connection with the Korean Patent Application No. 10-2018-0065426.

* cited by examiner

ELECTRONIC CONTROL APPARATUS AND METHOD OF CONTROLLING THE SAME

CROSS-REFERENCE TO RELATED APPLICATION(S)

This application is based on and claims priority under 35 U.S.C. § 119 to Korean Patent Applications No. 10-2018-0065426, filed on Jun. 7, 2018 and No. 10-2019-0030725, filed on Mar. 18, 2019 in the Korean Intellectual Property Office, the disclosures of which are incorporated by reference in their entireties.

TECHNICAL FIELD

Embodiments of the disclosure relate to an electronic control apparatus and a method of controlling the electronic control apparatus.

BACKGROUND

Examples of an Electronic Control Unit (ECU) that processes wheel speed information include an Anti-lock Brake System (ABS), an Electronic Stability Control (ESC), and an Integrated Dynamic Brake (IDB). Generally, the ECU may receive current flow of a wheel speed sensor mounted on a wheel of a vehicle as a signal, and process the wheel speed information by detecting the signal from a current detection circuit in the ECU.

When a failure occurs in the current detection circuit in the ECU, there was no circuit for replacing a function of detecting a wheel speed, and an entire system was limited to operate normally. Therefore, in case of the failure, an auxiliary operation device assisting an operation of the entire system in an emergency is being studied.

SUMMARY

Therefore, it is an aspect of the disclosure to provide an electronic control apparatus capable of processing wheel speed information, and a method of controlling the electronic control apparatus.

In particular, it is an aspect of the disclosure to provide an auxiliary detection circuit which can normally process the wheel speed information even in the event of failure of a main detection circuit for processing the wheel speed information, a method of controlling the auxiliary detection circuit.

Additional aspects of the disclosure will be set forth in part in the description which follows and, in part, will be obvious from the description, or may be learned by practice of the disclosure.

In accordance with an aspect of the disclosure, an electronic control apparatus includes: a first electronic control apparatus including a first signal processor configured to process a signal of a wheel speed sensor; and a second electronic control apparatus which includes a second signal processor configured to process the signal of the wheel speed sensor, a first switching device electrically provided between the wheel speed sensor and the first signal processor, configured to allow or block the signal of the wheel speed sensor to be transmitted to the first signal processor, and a second switching device electrically provided between the wheel speed sensor and the second signal processor, configured to allow or block the signal of the wheel speed sensor to be transmitted to the second signal processor.

The first electronic control apparatus may further include a first controller configured to transmit a switching operation command of the first switching device to the second electronic control apparatus based on whether the first signal processor is in a failure state.

When the first signal processor is not in the failure state, the first controller may transmit a turn-on switching operation command to the first switching device, and control the first signal processor so that the first signal processor processes the signal of the wheel speed sensor.

When the first signal processor is in the failure state, the first controller may transmit a turn-off switching operation command to the first switching device.

The first electronic control apparatus may further include a first controller configured to transmit a failure signal to the second electronic control apparatus based on whether the first signal processor is in a failure state. The second electronic control apparatus may further include a second controller configured to control operations of the first switching device and the second switching device in response to the failure signal.

When the failure signal is not received, the second controller may transmit a turn-on switching operation command to the first switching device, and transmit a turn-off switching operation command to the second switching device.

When the failure signal is received, the second controller may transmit a turn-off switching operation command to the first switching device, and transmit a turn-on switching operation command to the second switching device.

When the failure signal is received, the second controller may control the second signal processor to process the signal of the wheel speed sensor.

The second controller may transmit wheel speed information processed by the second signal processor to the first controller. The first controller may calculate a wheel speed according to the wheel speed information received from the second electronic control apparatus.

The first electronic control apparatus may further include a first controller configured to transmit a periodic normal operation signal to the second electronic control apparatus. The second electronic control apparatus may further include a second controller configured to control operations of the first switching device and the second switching device in response to receipt of the normal operation signal.

When the periodic normal operation signal is not transmitted from the first controller, the second controller may transmit a turn-off switching operation command to the first switching device, and transmit a turn-on switching operation command to the second switching device.

The second controller may control the second signal processor to process the signal of the wheel speed sensor, and calculate a wheel speed according to wheel speed information processed by the second signal processor.

In accordance with another aspect of the disclosure, a method of controlling an electronic control apparatus that includes a first electronic control apparatus and a second electronic control apparatus, the method includes: determining whether the first electronic control apparatus is malfunctioning; based on a failure of the first electronic control apparatus being not determined, allowing an output signal of a wheel speed sensor to be transmitted to the first electronic control apparatus, by a first switching device provided in the second electronic control apparatus and electrically provided between the wheel speed sensor and the first signal processor, and processing the output signal of the wheel speed sensor by the first electronic control apparatus; and based on the failure of the first electronic control apparatus being determined, blocking the output signal of the wheel speed sensor to be transmitted to the first electronic control apparatus by the first switching device, and processing the output signal of the wheel speed sensor by the second electronic control apparatus.

In accordance with another aspect of the disclosure, an electronic control apparatus includes: a first electronic control apparatus which includes a first switch, a first current sensor disposed in series between a wheel speed sensor and power by a short-circuit of the first switch, and a second switch disposed in series between the wheel speed sensor and a ground; and a second electronic control apparatus which includes a third switch disposed in series between the power and the wheel speed sensor, and a second current sensor disposed in series between the wheel speed sensor and the ground by the short-circuit of a fourth switch.

The first electronic control apparatus may further include a first controller configured to short the first switch and open the second switch when the first electronic control apparatus is in a normal operation. The second electronic control apparatus may further include a second controller configured to open the third switch and short the fourth switch when the second electronic control apparatus is in the normal operation.

The first controller may open the first switch and the second switch when the first electronic control apparatus is in a failure, and transmit open signal information of the first switch and the second switch to the second electronic control apparatus. The second controller may short the third switch and the fourth switch based on the open signal information of the first switch and the second switch.

The second controller may control the second current sensor so that the second current sensor detects a signal of the wheel speed sensor.

The second controller may open the third switch and the fourth switch when the second electronic control apparatus is in a failure, and transmit open signal information of the third switch and the fourth switch to the first electronic control apparatus. The first controller may short the first switch and the second switch based on the open signal information of the third switch and the fourth switch.

The second controller may control the second current sensor so that the second current sensor detects a signal of the wheel speed sensor.

The electronic control apparatus may compare a detected signal of the wheel speed sensor detected by the first current sensor with a detected signal of the wheel speed sensor detected by the second current sensor, and determine a failure of the wheel speed sensor based on a comparison result.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
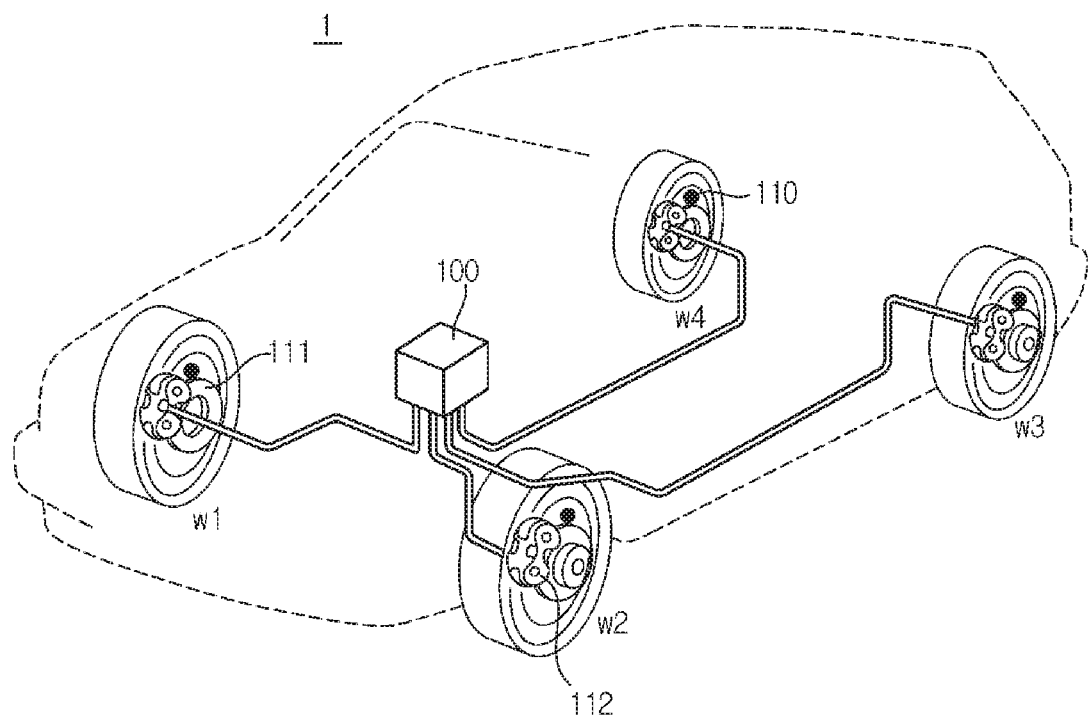
FIG. 1 is a view schematically illustrating a brake including an electronic control apparatus according to embodiments of the disclosure.

Like reference numerals refer to like elements throughout the specification. Not all elements of embodiments of the disclosure will be described, and description of what are commonly known in the art or what overlap each other in the embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

The principle and embodiments of the disclosure will now be described with reference to the accompanying drawings.

FIG. 1 is a view schematically illustrating a brake including an electronic control apparatus according to embodiments of the disclosure.

As illustrated in FIG. 1, an electronic control apparatus may control various devices included in a brake system of a vehicle 1.

The brake system of the vehicle 1 may include a detector 110 for detecting not only the electronic control apparatus but also a speed of wheels w1, w2, w3, and w4, a pedal travel switch (PTS) for detecting the depressing of a brake pedal, a brake disc 111 fixed to the wheels w1, w2, w3, and w4, a wheel cylinder to which hydraulic pressure acts, a caliper 112 including the wheel cylinder, and the like.

By pressing pads on both sides of a brake disc 111 rotating together with the wheels w1, w2, w3, and w4, a friction is generated and a braking force may be obtained. In the case of a closed drum brake, it is possible to compensate for the disadvantage that a drum is inflated due to a frictional heat when used repeatedly.

The caliper 112 brings the pad into close contact with the brake disc 111 to generate the friction, and may be operated by the hydraulic pressure. The caliper 112 may take the form of wrapping the brake disc 111 of the front wheels w1 and w2. When a brake is operating, the hydraulic pressure is generated in a master cylinder, the hydraulic pressure of the master cylinder may be transmitted to the wheel cylinder, and a brake oil of the wheel cylinder may be applied to the left and right sides of the brake disc 111 in the wheel cylinder. At this time, the force acting in the left and right may press an inner pad against the brake disc 111, and the force acting on the right may press an outer pad against the brake disc 111. The outer and inner pads are simultaneously pressed against the brake disc 111 to generate a frictional force.

The vehicle 1 equipped with an Anti-lock Brake System (ABS) may include a wheel speed sensor 110 for each of the wheels w1, w2, w3, and w4, and the brake system may analyze information detected by the wheel speed sensor 110. When one wheel is locked, by removing only the hydraulic pressure of the wheel, the balance of four wheels w1, w2, w3, and w4 may be maintained. Therefore, slipping of the vehicle 1 is prevented, and a braking distance may be shortened because the wheels w1, w2, w3, and w4 are not locked.

The wheel speed sensor 110 is installed in each of the front wheels w1 and w2 and the rear wheels w3 and w4, and may detect a change in a magnetic line of force in a tone wheel and a hall sensor in order to detect a rotational speed of the wheels w1, w2, w3, and w4.

The wheel speed sensor 110 may detect the rotational speed of the wheels w1, w2, w3, and w4 and output an electrical signal (current signal or voltage signal) corresponding to the rotational speed of the wheels w1, w2, w3, and w4, which may be the basis for measuring the speed of the vehicle 1. The electronic control apparatus of the brake system may determine the slip of the wheel by deriving the difference of the rotational speed of each of the four wheels w1, w2, w3, and w4.

Also, the electronic control apparatus may receive the current signal of the wheel speed sensor 110, and may detect the current signal from the current detection circuit in the electronic control apparatus. From the detected current signal, the electronic control apparatus may calculate the rotation speed of the wheel.

However, there is no a circuit that can detect the current signal of the wheel speed sensor 110 when the electronic control apparatus cannot normally process the current signal, such as when the current detection circuit included in the electronic control apparatus is in a failure state, so that there is a problem that a normal function cannot be performed.

Hereinafter, the electronic control apparatus including an auxiliary circuit that can replace the function when the electronic control apparatus that processes the wheel speed information cannot normally process the current signal will be described in detail.

Figure 2:
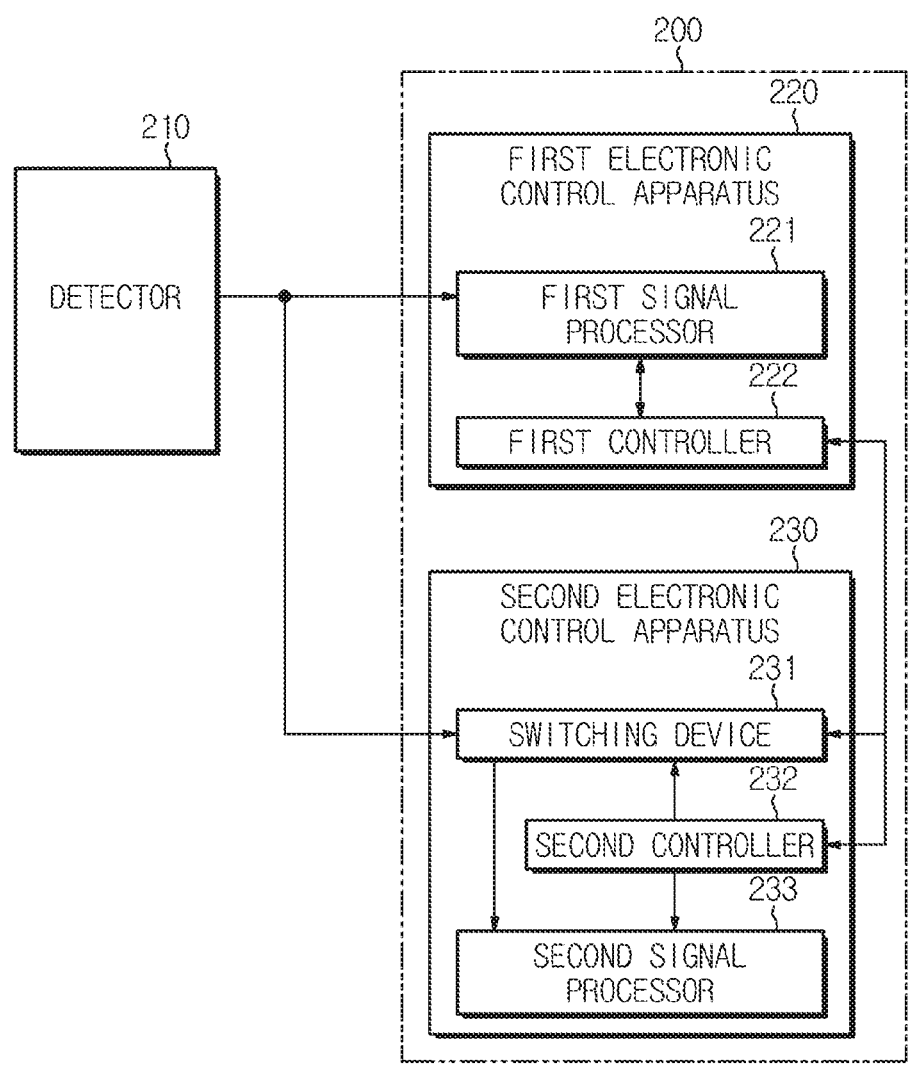
FIG. 2 is a block diagram illustrating a connection state of an electronic control apparatus according to embodiments of the disclosure.

FIG. 2 is a block diagram illustrating a connection state of an electronic control apparatus according to embodiments of the disclosure.

As illustrated in FIG. 2, an electronic control apparatus 200 may include a first electronic control apparatus 220 and a second electronic control apparatus 230.

The first electronic control apparatus 220 and the second electronic control apparatus 230 may be connected to a detector 210.

The detector 210 may detect the rotational speed of the wheel and may output the current signal corresponding to the detected rotational speed. The current signal representing the rotational speed of the wheel may be used as a control basis for at least one of the first electronic control apparatus 220 and the second electronic control apparatus 230.

To this end, the detector 210 may include the wheel speed sensor 110. The wheel speed sensor 110 may include a first front wheel speed sensor 111F (see FIG. 3), a second front wheel speed sensor 112F (see FIG. 3), a first rear wheel speed sensor 111R (see FIG. 3), a second rear wheel speed sensor 112R (see FIG. 3).

The first electronic control apparatus 220 may include a first signal processor 221 and a first controller 222.

The first signal processor 221 may receive the wheel speed information detected by the detector 210 and may detect and process the current signal of the wheel speed.

For example, the first signal processor 221 may receive the current signal representing the wheel speed detected by the detector 210, and may output the wheel speed information by signal processing the current signal representing the wheel speed.

To this end, the first signal processor 221 may include the current detection circuit and may be implemented as an Application Specific Integrated Circuit (ASIC).

The wheel speed information processed by the first signal processor 221 may be transmitted to the first controller 222. The first controller 222 may determine the wheel speed according to the wheel speed information transmitted from the first signal processor 221.

Also, the first controller 222 may determine whether various configurations in the first electronic control apparatus 220 are operating normally, and in particular, may determine whether the first signal processor 221 is operating normally.

For example, the first controller 222 may determine whether the first signal processor 221 is operating normally by determining whether the current signal received by the first signal processor 221 meets a predetermined reference.

As such, the first controller 222 may control the various configurations included in the first electronic control apparatus 220, and may transmit the signal including a control command for controlling the configurations of the second electronic control apparatus 230 to the second electronic control apparatus 230.

For example, the first controller 222 may transmit the control command for controlling the switching device 231 of the second electronic control apparatus 230 to be described later to the second electronic control apparatus 230. In this way, the first controller 222 may control the operation of the switching device 231 of the second electronic control apparatus 230.

The first controller 222 may also transmit a failure signal to the second electronic control apparatus 230 when the first signal processor 221 is not operating normally.

To this end, the first controller 222 may include a Micro Control Unit (MCU).

The second electronic control apparatus 230 may include the switching device 231, a second signal processor 233, and a second controller 232.

The switching device 231 may be electrically provided between the detector 210 and the first and second signal processors 221 and 233, and may cause the wheel speed information detected by the detector 210 to be transmitted to the first signal processor 221 or to the second signal processor 233 through a turn-on switching operation or a turn-off switching operation.

Also, the switching device 231 may include a first switching device 231a (see FIG. 3) and a second switching device 231b (see FIG. 3), and a description thereof will be described later.

The second signal processor 233 may receive the wheel speed information detected by the detector 210 through the turn-on switching operation of the switching device 231.

The second signal processor 233 may receive the wheel speed information detected by the detector 210 and may detect and process the current signal of the wheel speed.

Particularly, the second signal processor 233 may receive the current signal representing the wheel speed detected by the detector 210, and may output the wheel speed information by signal processing the current signal representing the wheel speed.

To this end, the second signal processor 233 may include the current detection circuit and may be implemented as the ASIC.

The wheel speed information processed by the second signal processor 233 may be transmitted to the second controller 232. The second controller 232 may determine the wheel speed according to the wheel speed information transmitted from the first signal processor 221.

The second controller 232 may also control the switching device 231 and the second signal processor 233, and in particular, may control the switching device 231 based on the signal transmitted from the first electronic control apparatus 220.

In addition, the second controller 232 may control various devices to assist the function of the first electronic control apparatus 220.

To this end, the second controller 232 may include the MCU.

Figure 3:
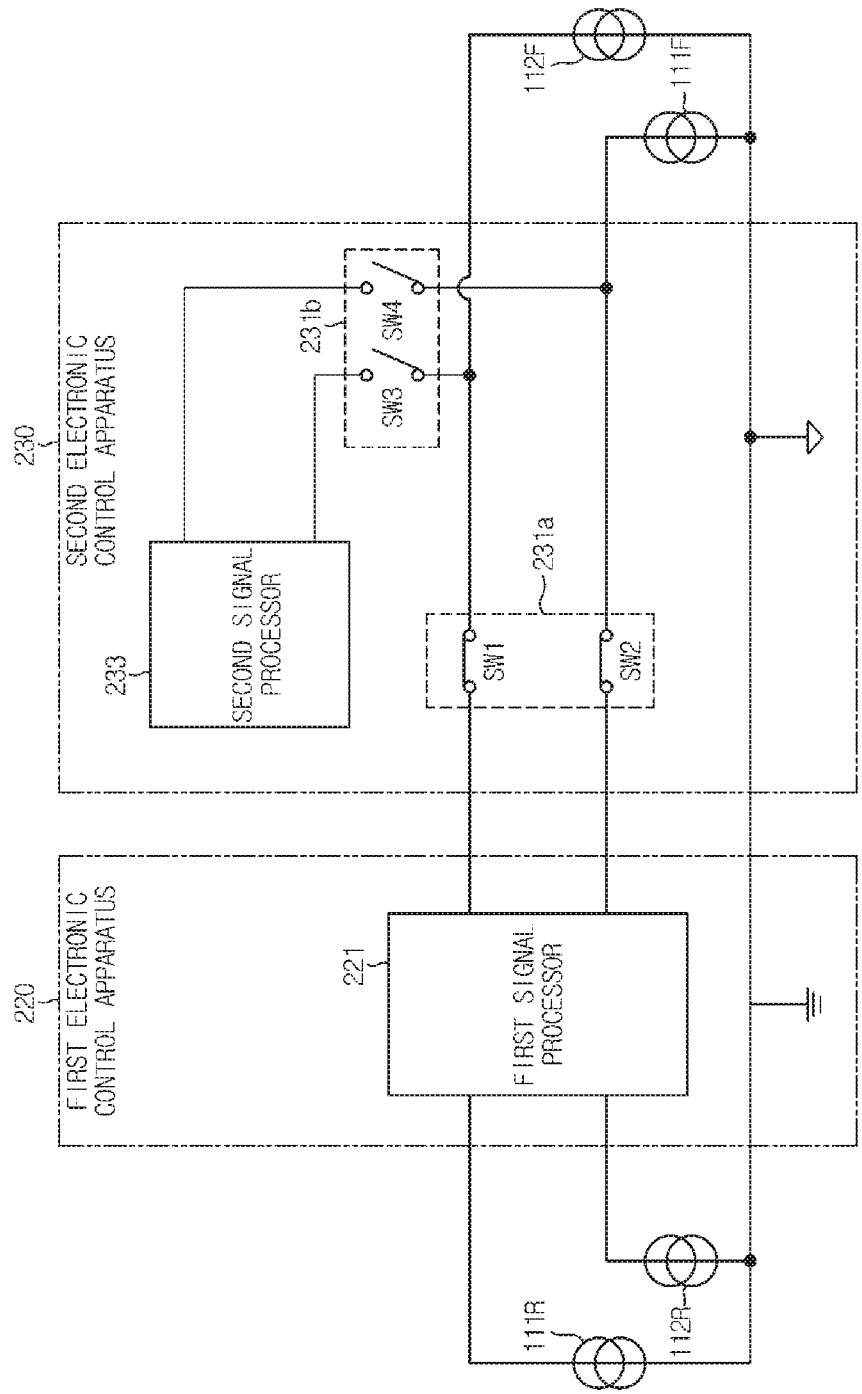
FIG. 3 is a circuit diagram schematically illustrating current flow when a first electronic control apparatus according to embodiments of the disclosure is in a normal state.

FIG. 3 is a circuit diagram schematically illustrating current flow when a first electronic control apparatus according to embodiments of the disclosure is in a normal state.

Referring to FIG. 3, the first electronic control apparatus 220 may be directly connected to the first and second rear wheel speed sensors 111R and 112R, and may be connected to the first and second front wheel speed sensors 111F and 112F through the second electronic controller 230. However, a connection relationship between the wheel speed sensor 110 and the first electronic control apparatus 220 is not limited to the above. For example, the first electronic control apparatus 220 may be directly connected to the first and second front wheel speed sensors 111F and 112F, and may be connected to the first and second rear wheel speed sensors 111R and 112R through the second electronic controller 230.

The switching device 231 of the second electronic control apparatus 230 may include a first switching device 231a and a second switching device 231b.

The first switching device 231a may include first and second switches SW1 and SW2 provided between the first signal processor 221 and the first and second front wheel speed sensors 111F and 112F. The second switching device 231b may include third and fourth switches SW3 and SW4 provided between the second signal processor 233 and the first and second front wheel speed sensors 111F and 112F.

As described above, the first controller 222 of the first electronic control apparatus 220 may determine whether the first signal processor 221 is operating normally.

Particularly, the first controller 222 may determine that the first signal processor 221 operates normally when a signal value processed by the first signal processor 221 satisfies a predetermined condition.

When the first signal processor 221 operates normally, the first electronic control apparatus 220 may perform the normal function, and the second electronic control apparatus 230 may transmit the wheel speed information detected by the detector 210 to the first electronic control apparatus 220.

Particularly, the second controller 232 may control the switching device 231 to transmit the wheel speed information detected by the detector 210 to the first electronic control apparatus 220. At this time, the first switching device 231a may perform the turn-on switching operation.

Also, while the first switching device 231a is performing the turn-on switching operation, the second switching device 231b may perform the turn-off switching operation so that the wheel speed information detected by the detector 210 is not be transmitted to the second signal processor 233.

To this end, the second electronic control apparatus 230 may transmit the wheel speed information detected by the detector 210 to the first electronic control apparatus 230 but not to the second signal processor 233.

That is, the second electronic control apparatus 230 may cause the first electronic control apparatus 220 to process the wheel speed information by bypassing the wheel speed information detected by the detector 210.

Figure 4:
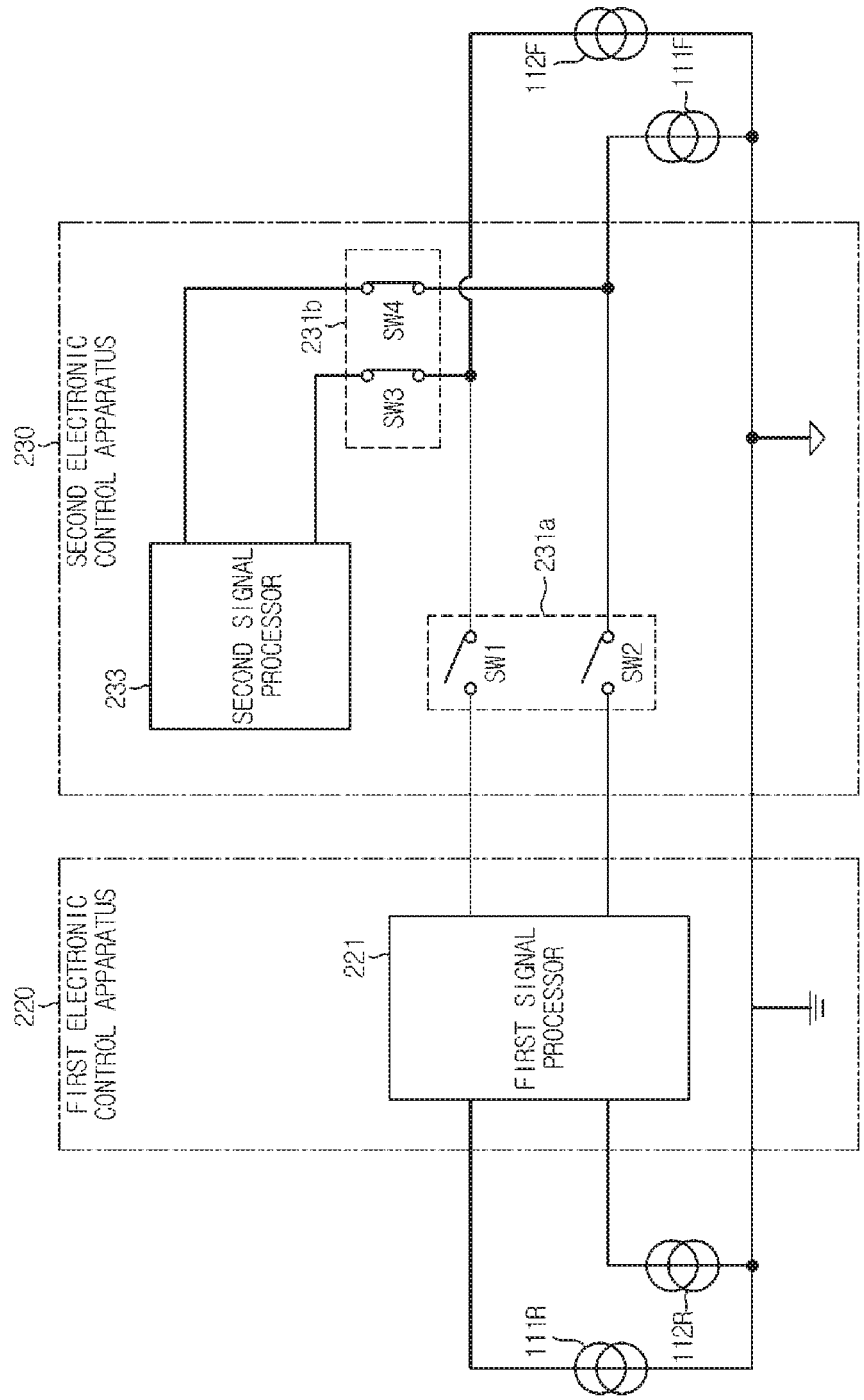
FIG. 4 is a circuit diagram schematically illustrating current flow when a first electronic control apparatus according to embodiments of the disclosure is in a failure state.

FIG. 4 is a circuit diagram schematically illustrating current flow when a first electronic control apparatus according to embodiments of the disclosure is in a failure state.

The first controller 222 may determine that the first signal processor 221 is in the failure state when the signal value processed by the first signal processor 221 does not satisfy the predetermined condition.

As illustrated in FIG. 4, when the first signal processor 221 is in the failure state, the first and second switches SW1 and SW2 of the first switching device 231a may perform the turn-off switching operation, the third and fourth switches SW3 and SW4 of the second switching device 231b may perform the turn-on switching operation.

As the first and second switches SW1 and SW2 of the first switching device 231a perform the turn-off switching operation, the wheel speed information detected by the detector 210 may not be transmitted to the first electronic control apparatus 220.

As the third and fourth switches SW3 and SW4 of the second switching device 231b perform the turn-off switching operation, the wheel speed information detected by the detector 210 may be transmitted to the second signal processor 233. The wheel speed information may be signal processed by the second signal processor 233.

Accordingly, when the first electronic control apparatus 220 is in the failure state, the wheel speed information detected by the detector 210 is not transmitted to the first electronic control apparatus 220 so that it is possible to process the accurate wheel speed information.

Further, the wheel speed information may be signal processed by the second electronic control apparatus 230 so that the first electronic control apparatus 220 may perform its function even in the event of the failure.

Figure 5:
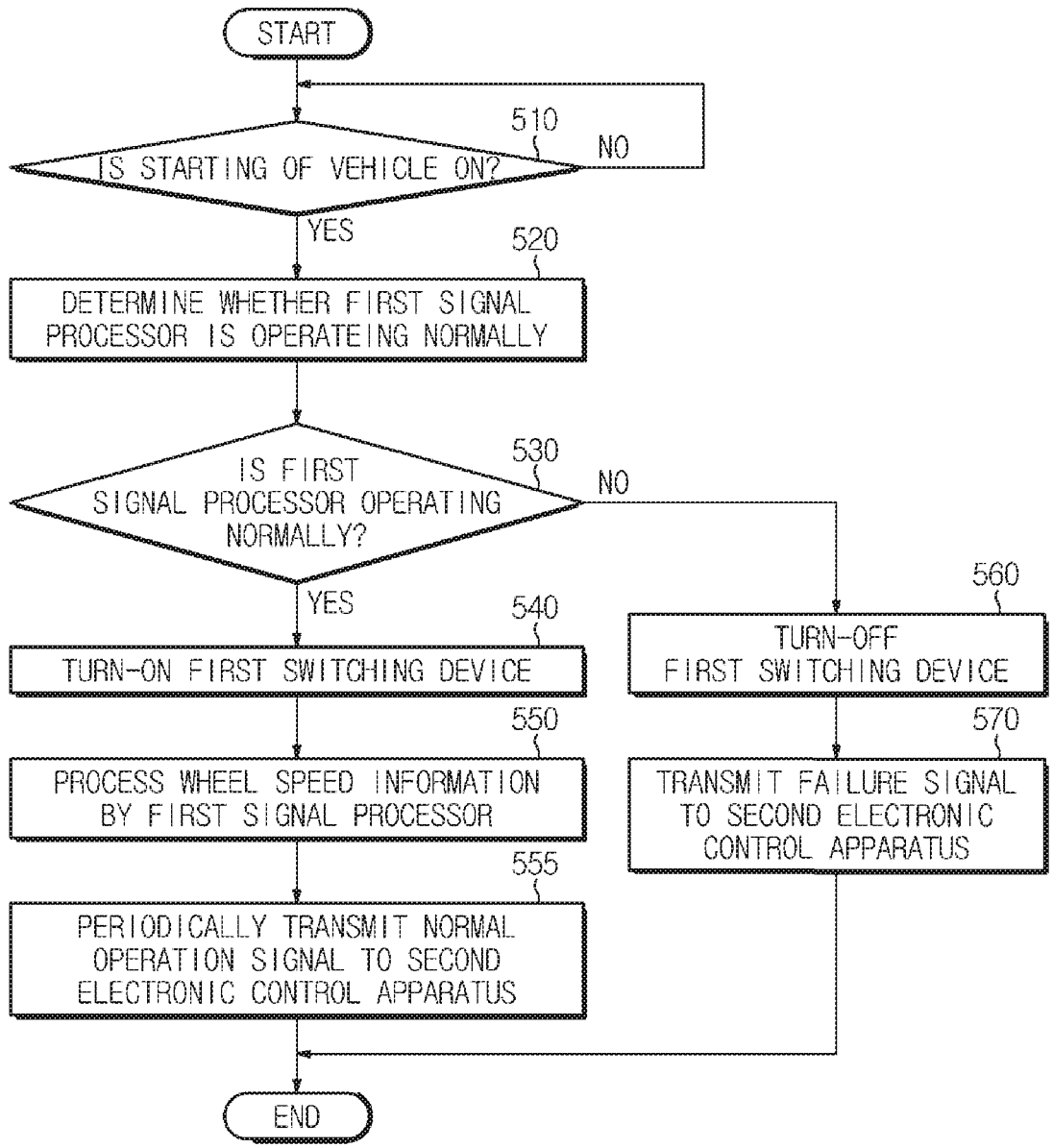
FIG. 5 is a flowchart of a method of controlling a first electronic control apparatus according to embodiments of the disclosure.

FIG. 5 is a flowchart of a method of controlling a first electronic control apparatus according to embodiments of the disclosure.

The first electronic control apparatus 220 may check whether a starting of the vehicle 1 is on (510).

When the starting of the vehicle 1 is on (510), the first controller 222 may determine whether the first signal processor 221 is operating normally (520).

Particularly, the first controller 222 may determine whether the first signal processor 221 is operating normally by determining whether the current of the detector 210 detected by the first signal processor 221 meets the predetermined reference.

When the first signal processor is operating normally (YES in 530), the first electronic control apparatus 220 may transmit the control command to cause the first switching device 231a of the second electronic control apparatus 230 to perform the turn-on switching operation, and the first switching device 231a may perform the turn-on switching operation (540).

The wheel speed information may be signal processed by the first signal processor 221 (550). The signal processed wheel speed information may be used as the control basis of the first controller 222 to calculate the rotational speed of the wheel.

For example, the first signal processor 221 may receive the current signal representing the wheel speed of the front wheels and the rear wheels w1, w2, w3 and w4 from the first front wheel speed sensor 111F, the second current wheel speed sensor 112F, the first rear wheel speed sensor 111R, and the second rear wheel speed sensor 112R. The first signal processor 221 may process the current signal representing the wheel speed to generate the wheel speed information. The first signal processor 221 may also transmit the wheel speed information to the first controller 222.

The first controller 222 may determine whether a wheel slip has occurred based on the wheel speed information.

Thereafter, the first electronic control apparatus 220 may periodically transmit a normal operation signal to the second electronic control apparatus 230 during a normal operation (555).

For example, the first controller 222 may periodically transmit the normal operation signal to the second controller 232 during the normal operation of the first signal processor 221.

When the first signal processor 221 does not operate normally (NO in 530), the first controller 222 may transmit the control command so that the first switching device 231a performs the turn-off switching operation, and the switching device 231a may perform the turn-off switching operation (560).

The first controller 222 may then transmit the failure signal to the second electronic control apparatus 230 (570). The first controller 222 may cause the second electronic control apparatus 230 to perform a corresponding function of the first electronic control apparatus 220 by transmitting the failure signal.

For example, the second controller 233 may provide the control command so that the second switching device 231b performs the turn-on switching operation in response to the failure signal of the first controller 222, and the second switching device 231b) may perform the turn-on switching operation.

As a result, the wheel speed information may be signal processed by the second signal processor 233.

For example, the second signal processor 233 may receive the current signal representing the wheel speed of the front wheels w1 and w2 from the first front wheel speed sensor 111F and the second current wheel speed sensor 112F, and the second signal processor 233 may process the current signal representing the wheel speed to generate the wheel speed information. The second signal processor 233 may also transmit the wheel speed information to the second controller 232.

For example, the second controller 232 may determine whether the wheel slip has occurred based on the wheel speed information.

As another example, the second controller 232 may transmit the wheel speed information to the first controller 222, and the first controller 222 may determine whether the wheel slip has occurred based on the wheel speed information.

Accordingly, even when the first electronic control apparatus 220 is in the failure state, it is possible to process the accurate wheel speed information, thereby enhancing the safety of a passenger.

Figure 6:
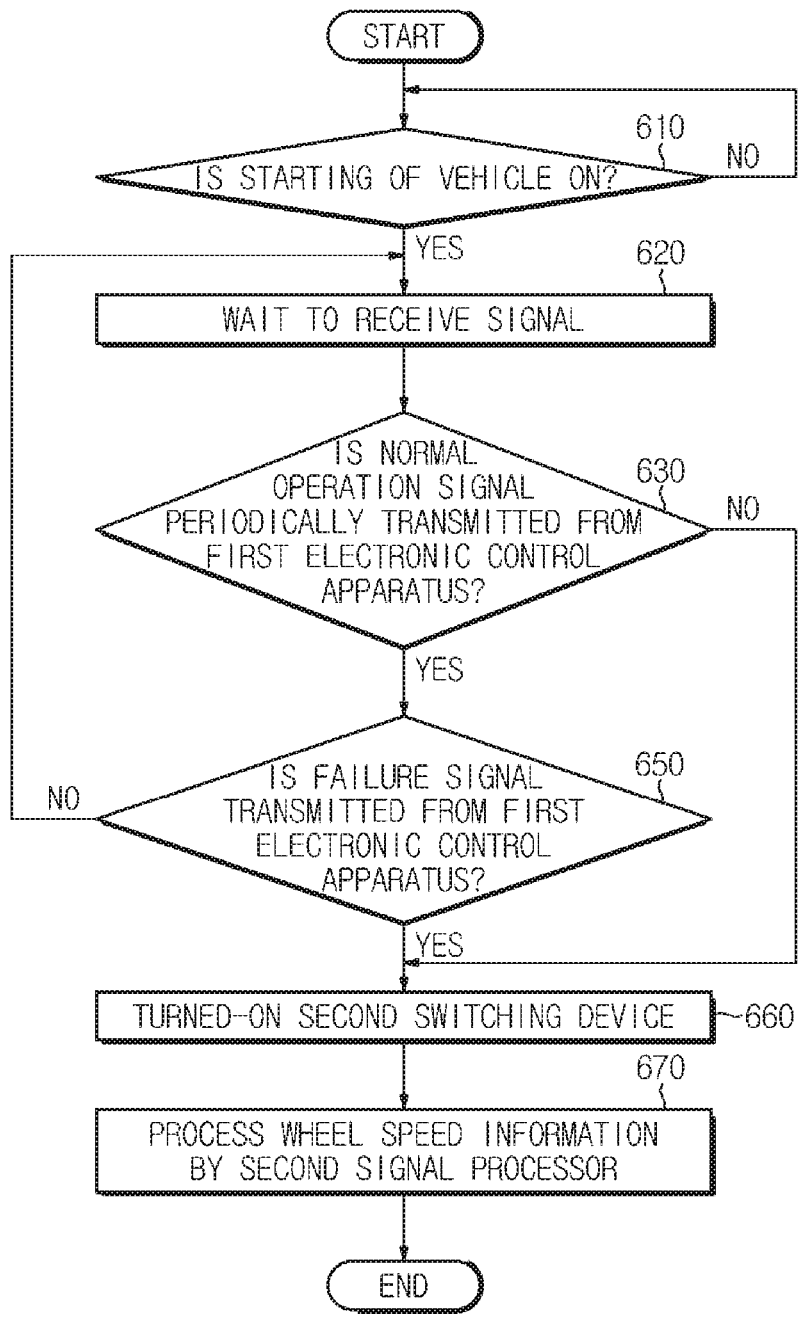
FIG. 6 is a flowchart of a method of controlling a second electronic control apparatus according to embodiments of the disclosure.

FIG. 6 is a flowchart of a method of controlling a second electronic control apparatus according to embodiments of the disclosure.

The second electronic control apparatus 220 may identify whether the starting of the vehicle 1 is on (610).

When the starting of the vehicle 1 is on (step 610), the second electronic control apparatus 230 may wait to receive the signal from the first electronic control apparatus 220 (620).

The second electronic control apparatus 230 may identify whether the normal operation signal is periodically transmitted from the first electronic control apparatus 220 (630). At this time, the normal operation signal periodically transmitted from the first electronic control apparatus 220 may include the signal that generates as the first electronic control apparatus 220 performs its normal function.

When the second electronic control apparatus 230 determines that the normal operation signal is periodically transmitted from the first electronic control apparatus 220 (YES in 630), the second electronic control apparatus 230 may identify whether the failure signal is transmitted from the first electronic control apparatus 220 (650).

At this time, the failure signal may refer to the signal representing that the first signal processor 221 of the first electronic control apparatus 220 is in the failure state.

When the failure signal is transmitted from the first electronic control apparatus 220 (YES in 650) the second controller 232 may control the second switching device 231b to perform the turn-on switching operation, and the second switching device 231b may perform the turn-on switching operation (660).

When the second switching device 231b performs the turn-on switching operation, the wheel speed information detected by the detector 210 may be transmitted to the second signal processor 233. Accordingly, the wheel speed information may be processed by the second signal processor 233 (670).

For example, the second signal processor 233 may receive the current signal representing the wheel speed of the front wheels w1 and w2 from the first front wheel speed sensor 111F and the second current wheel speed sensor 112F, and the second signal processor 233 may process the current signal representing the wheel speed to generate the wheel speed information. The second signal processor 233 may also transmit the wheel speed information to the second controller 232.

For example, the second controller 232 may determine whether the wheel slip has occurred based on the wheel speed information.

For example, the second controller 232 may transmit the wheel speed information to the first controller 222, and the first controller 222 may determine whether the wheel slip has occurred based on the wheel speed information.

Thus, even if the failure of the first signal processor 221 occurs, the function of the first signal processor 221 may be performed by the second electronic control apparatus 230. The accuracy of the wheel speed information processing may be enhanced.

When it is determined that the normal operation signal is not periodically transmitted from the first electronic control apparatus 220 (NO in 630), the second controller 232 may control the second switching device 231b to perform the turn-on switching operation, the second switching device 231b may perform the turn-on switching operation 660, and the wheel speed information may be processed by the second signal processor 233 (670).

At this time, when the normal operation signal is not periodically transmitted from the first electronic control apparatus 220, the first signal processor 221 of the first electronic control apparatus 220 as well as other internal configurations may not operate normally.

Accordingly, the second electronic control apparatus 230 may perform the overall function of the first electronic control apparatus 220 as well as a wheel speed information processing function of the first signal processor 221.

Particularly, the second controller 232 may not transmit the wheel speed information to the first controller 222, and may determine whether the wheel slip has occurred based on the wheel speed information.

Accordingly, when the first electronic control apparatus 220 cannot perform the normal function as well as the wheel speed information processing, the overall function of the first electronic control apparatus 220 including the wheel speed information processing function and a wheel speed calculating function may be performed by the second electronic control apparatus 220.

Therefore, the safety of the passenger of the vehicle 1 may be enhanced by performing the function of the first electronic control apparatus 220 by the first electronic control apparatus 220.

Figure 7:
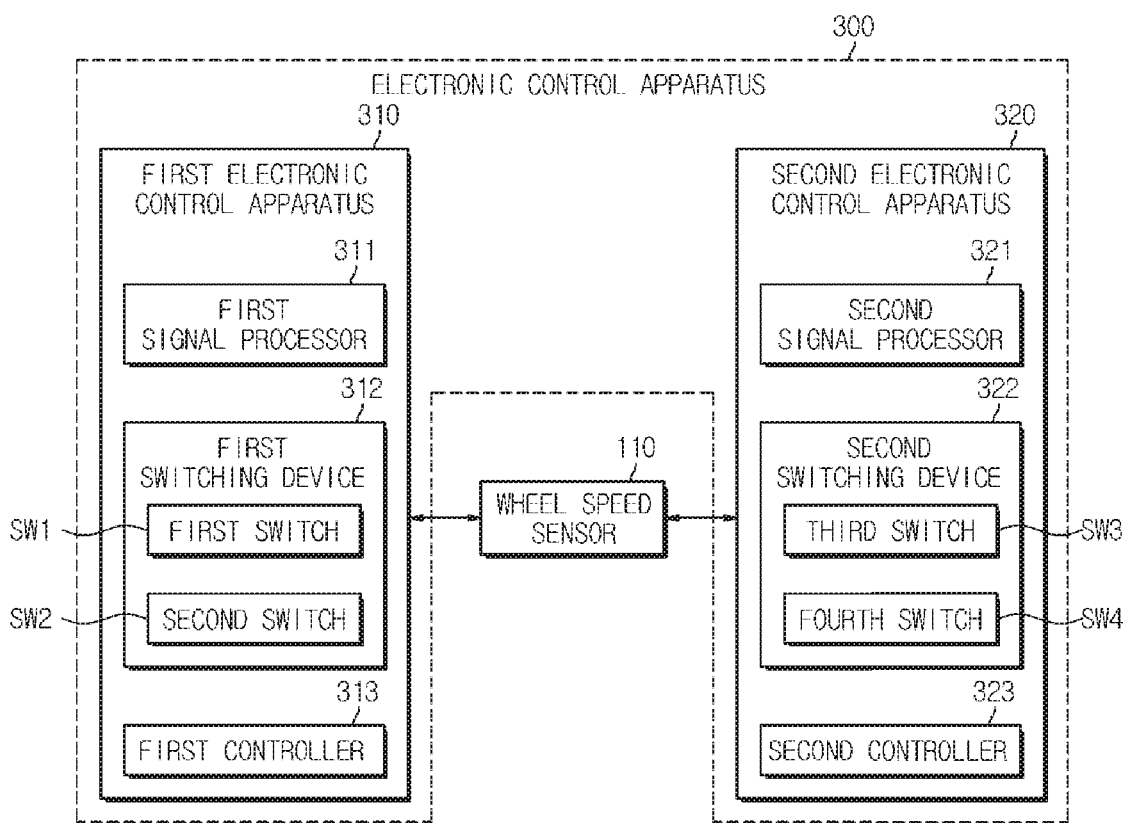
FIG. 7 is a block diagram illustrating a connection state of an electronic control apparatus according to embodiments of the disclosure.

FIG. 7 is a block diagram illustrating a connection state of an electronic control apparatus according to embodiments of the disclosure.

As illustrated in FIG. 7, an electronic control apparatus 300 may include a first electronic control apparatus 310 and a second electronic control apparatus 320. The first electronic control apparatus 310 and the second electronic control apparatus 320 may be connected to the wheel speed sensor 110 (see FIG. 1).

The wheel speed sensor 110 may include a first front wheel speed sensor 11F (see FIG. 3), a second front wheel speed sensor 112F (see FIG. 3), a first rear wheel speed sensor 111R (see FIG. 3), a second rear wheel speed sensor 112R (see FIG. 3).

The first electronic control apparatus 310 and the second electronic control apparatus 320 may obtain the current signal representing the rotational speed output from the wheel speed sensor 110 by the respective first signal processor 311 and the second signal processor 321.

Particularly, the first electronic control apparatus 310 may include a first signal processor 311, a first switching device 312, and a first controller 313.

The first signal processor 311 may detect the current signal representing the rotational speed of the wheel and may output rotational speed information of the wheel.

For example, the first signal processor 311 may receive the current signal representing the wheel speed detected by the wheel speed sensor 110, and may output the wheel speed information by signal processing the current signal representing the wheel speed. The first signal processor 311 may include a first current sensor 311a (see FIG. 8) that detects the current signal.

To this end, the first signal processor 311 may include the current detection circuit and may be implemented as the ASIC.

The rotational speed information of the wheel may be used as the control basis of the first electronic control apparatus 310.

Accordingly, the first controller 313 may receive the wheel speed information output from the first signal processor 311 and process the wheel speed information.

The first controller 313 may detect the current of the first signal processor 311 and determine the wheel speed according to the transmitted wheel speed information.

In addition, the first controller 313 may determine whether the various configurations in the first electronic control apparatus 310 are operating normally, and in particular, determine whether each of the configurations in the first electronic control apparatus 310 is operating normally.

For example, the first controller 313 may control short-circuit or opening of each switch included in the first switching device 312 depending on whether the first electronic control apparatus 310 is normally operating. At this time, the first switching device 312 may include the first switch SW1 and the second switch SW2.

For example, when the electronic control apparatus 300 operates normally, the first controller 313 may transmit the control signal to short the first switch SW1 and open the second switch SW2. When the first electronic control apparatus 310 operates abnormally, the first controller 313 may transmit the control signal to open both the first switch SW1 and the second switch SW2.

At this time, the first controller 313 may determine whether the first signal processor 311 is operating normally by determining whether the current detected by the first signal processor 311 of the first electronic control apparatus 310 meets the predetermined reference.

As such, the first controller 313 may control the various configurations included in the first electronic control apparatus 310, and may transmit the signal including the control command for controlling the configurations of the second electronic control apparatus 320 to the second electronic control apparatus 320

For this, the first controller 313 may include the MCU.

The second electronic control apparatus 320 may include a second signal processor 321, a second switching device 322, and a second controller 323.

The second signal processor 321 may detect the current signal representing the rotational speed of the wheel and may output rotational speed information of the wheel.

For example, the second signal processor 321 may receive the current signal representing the wheel speed detected by the wheel speed sensor 110, and may output the wheel speed information by signal processing the current signal representing the wheel speed. The second signal processor 321 may include a second current sensor 321a (see FIG. 8) that detects the current signal.

To this end, the second signal processor 321 may include the current detection circuit and may be implemented as the ASIC.

The rotational speed information of the wheel may be used as the control basis of the second electronic control apparatus 320.

The second switching device 322 may be connected to the second signal processor 321 and the second controller 323, and may open or short-circuit the third switch SW3 or the fourth switch SW4 included in the second switching device 322 according to the control signal of the second controller 323. Accordingly, the second controller 323 may transmit the current signal representing the wheel speed detected by the wheel speed sensor 110 to the second signal processor 321.

Accordingly, the second controller 323 may calculate the wheel speed according to the wheel speed information transmitted from the second signal processor 321.

In addition, the second controller 323 may determine whether the various configurations in the second electronic control apparatus 320 are operating normally, and in particular, determine whether each of the configurations in the second electronic control apparatus 320 is operating normally.

For example, when the electronic control apparatus 300 operates normally, the second controller 323 may transmit the control signal to open the third switch SW3 and short the fourth switch SW4. When the second electronic control apparatus 320 operates abnormally, the first controller 313 may transmit the control signal to open both the third switch SW3 and the fourth switch SW4.

At this time, the second controller 323 may determine whether the second signal processor 321 is operating normally by determining whether the current detected by the second signal processor 321 of the second electronic control apparatus 320 meets the predetermined reference.

As such, the second controller 323 may control the various configurations included in the second electronic control apparatus 320, and may transmit the signal including the control command for controlling the configurations of the first electronic control apparatus 310 to the first electronic control apparatus 310

For this, the second controller 323 may include the MCU.

Figure 8:
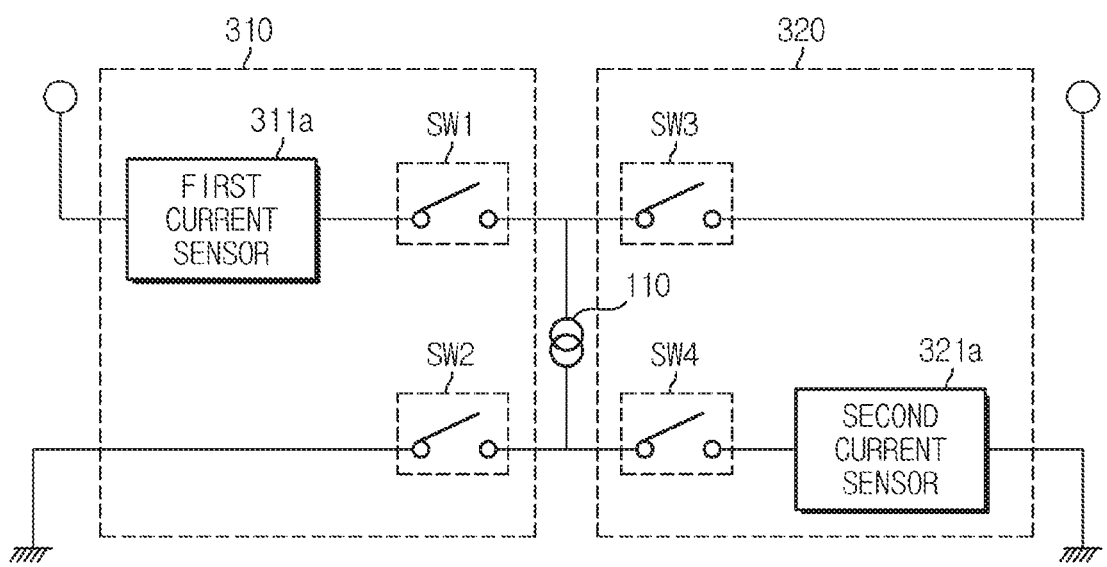
FIG. 8 is an internal circuit diagram schematically illustrating an electronic control apparatus according to embodiments of the disclosure.

FIG. 8 is an internal circuit diagram schematically illustrating an electronic control apparatus according to embodiments of the disclosure.

That is, the electronic control apparatus 300 may include the first electronic control apparatus 310 including the first current sensor 311a, the first switch SW1, and the second switch SW2, and the second electronic control apparatus 320 including the second current sensor 321a, the third switch SW3, and the fourth switch SW4.

In particular, the circuit composed of the first current sensor 311a of the first electronic control apparatus 310 may be connecting circuit to detect a wheel speed value at the top of the wheel speed sensor 110, and the circuit composed of the current sensor 321a may be connecting circuit to detect the wheel speed value at the lower end of the wheel speed sensor 110.

In this case, the first current sensor 311a may be configured to be connected in series with a main power, and the first current sensor 311a, the first switch SW1, and the second switch SW2 may be connected in series.

Further, the wheel speed sensor 110 may be arranged between the first switch SW1 and the second switch SW2.

The second current sensor 321a may be configured to be directly connected to a ground in series, and the second current sensor 321a, the third switch SW3, and the fourth switch SW4 may be configured to be connected in series.

At this time, the wheel speed sensor 110 may be arranged between the third switch SW3 and the fourth switch SW4, and the third switch SW3 may regulate the main power is applied or cut off from the circuit composing the second electronic control apparatus 320.

Figure 9:
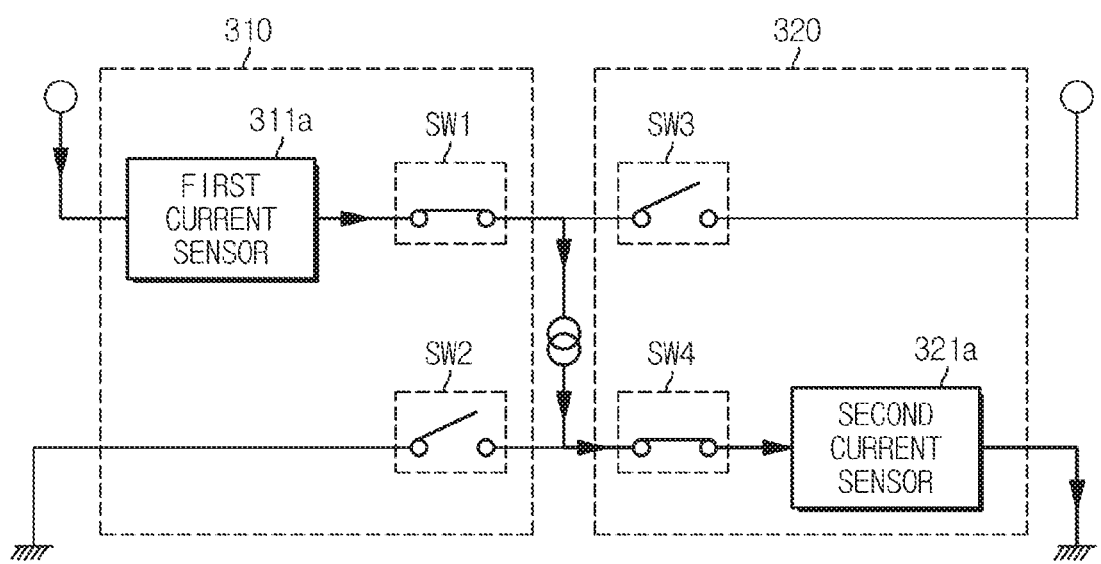
FIG. 9 is an internal circuit diagram schematically illustrating current flow in a normal operation of an electronic control apparatus according to embodiments of the disclosure.
Figure 10:
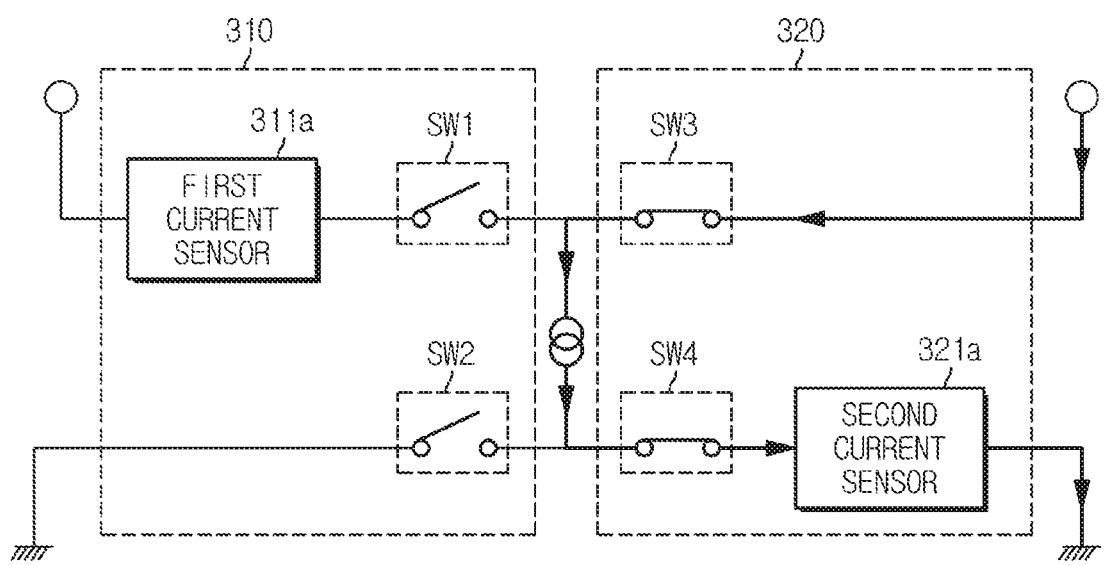
FIG. 10 is a circuit diagram schematically illustrating current flow in a failure of a first electronic control apparatus of an electronic control apparatus according to embodiments of the disclosure.
Figure 11:
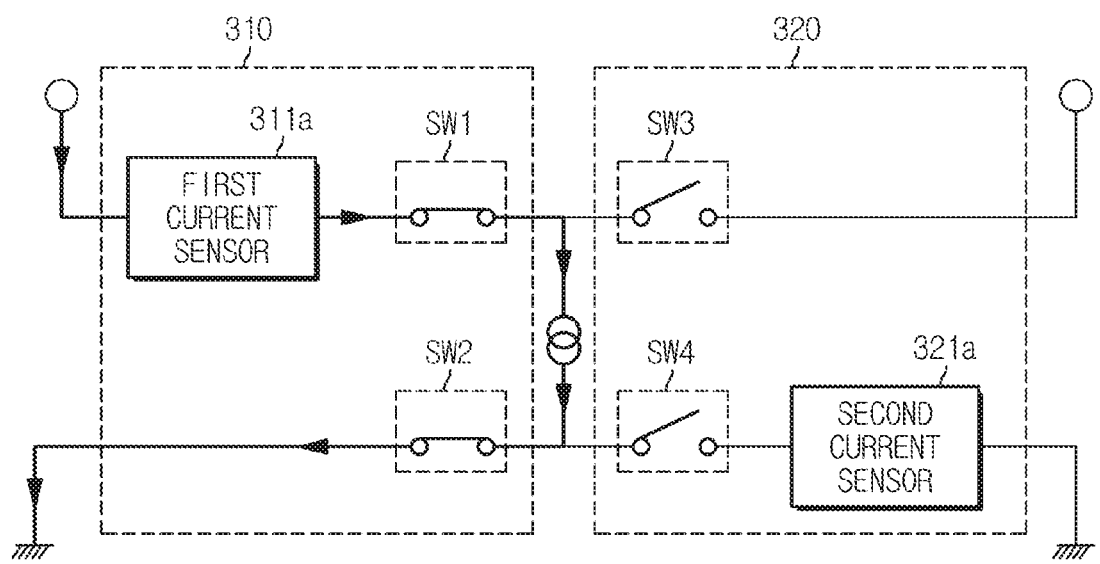
FIG. 11 is a circuit diagram schematically illustrating current flow in a failure of a second electronic control apparatus of an electronic control apparatus according to embodiments of the disclosure.

FIG. 9 is an internal circuit diagram schematically illustrating current flow in a normal operation of an electronic control apparatus according to embodiments of the disclosure, FIG. 10 is a circuit diagram schematically illustrating current flow in a failure of a first electronic control apparatus of an electronic control apparatus according to embodiments of the disclosure, and FIG. 11 is a circuit diagram schematically illustrating current flow in a failure of a second electronic control apparatus of an electronic control apparatus according to embodiments of the disclosure.

As illustrated in FIG. 9, during the normal operation of the electronic control apparatus 300, the first switch SW1 in the first electronic control apparatus 310 and the fourth switch SW4 in the second electronic control apparatus 320 are short-circuited to supply power to the wheel speed sensor 110 in the first electronic control apparatus 310. The ground may be provided through the second electronic control apparatus 320. Therefore, the first current sensor 311a and the second current sensor 321a may be connected in series with the first switch SW1, the wheel speed sensor 110, and the fourth switch SW4 interposed therebetween.

Accordingly, the wheel speed information processed by the first controller 313 of the first electronic control apparatus 310 and the wheel speed information processed by the second controller 323 of the second electronic control apparatus 320 are transmitted and compared with each other, and thus the failure information of the signal of the wheel speed sensor 110 may be detected.

Accordingly, the first electronic control apparatus 310 and the second electronic control apparatus 320 including the respective detection circuits may determine whether the wheel speed sensor 110 is malfunctioning.

When the first electronic control apparatus 310 is in the failure state, the opening and shorting of each switch may be changed as in FIG. 10. Particularly, FIG. 10 illustrates a circuit diagram for detecting the signal of the wheel speed sensor 110 by the second electronic control apparatus 320 when the first electronic control apparatus 310 is in the failure state. Similarly, when the second electronic control apparatus 320 is in the failure state, as in FIG. 11, the opening and shorting of each switch may be changed as in FIG. 11.

According to FIG. 10, it may be determined whether the first electronic control apparatus 310 is operating normally by determining whether the current detected by the first current sensor 311a of the first electronic control apparatus 310 meets the predetermined reference. When it is determined that the first electronic control apparatus 310 is in the failure state, the first controller 313 may open both the first switch SW1 and the second switch SW2.

The first controller 313 may transmit the information representing that the first electronic control apparatus 310 is in the failure state to the second electronic control apparatus 320. The second electronic control apparatus 320 may be short-circuited both the third switch SW3 and the fourth switch SW4 based on the failure information of the first electronic control apparatus 310.

Therefore, as illustrated in FIG. 10, the second electronic control apparatus 320 may supply the power and ground to the wheel speed sensor 110 so that the third switch SW3, the wheel speed sensor 110, the fourth switch SW4, and the second current sensor 321a may be connected in series. Thus, the operation of the wheel speed sensor 110 may be detected through the second electronic control apparatus 320.

Similarly, according to FIG. 11, it may be determined whether the second electronic control apparatus 320 is operating normally by determining whether the current detected by the second current sensor 321a of the second electronic control apparatus 320 meets the predetermined reference. When it is determined that the second electronic control apparatus 320 is in the failure state, the second controller 323 may open both the third switch SW3 and the fourth switch SW4.

The second controller 323 may transmit the information representing that the second electronic control apparatus 320 is in the failure state to the first electronic control apparatus 310. The first electronic control apparatus 310 may be short-circuited both the first switch SW1 and the second switch SW2 based on the failure information of the second electronic control apparatus 320.

Therefore, as illustrated in FIG. 11, the first electronic control apparatus 310 may supply the power and ground to the wheel speed sensor 110 so that the first switch SW1, the wheel speed sensor 110, the second switch SW2, and the first current sensor 311a may be connected in series. Thus, the operation of the wheel speed sensor 110 may be detected through the first electronic control apparatus 310.

The configuration and circuit diagram of the electronic control apparatus 300 including the circuit for detecting the operation signal of the wheel speed sensor 110 have been described above.

Hereinafter, an operation method of the electronic control apparatus 300 will be described in detail. First, FIG. 12 is a flowchart of a control method in a normal operation of an electronic control apparatus according to embodiments of the disclosure, and FIGS. 13A and 13B are flowcharts of a control method in a failure of an electronic control apparatus according to embodiments of the disclosure.

Figure 12:
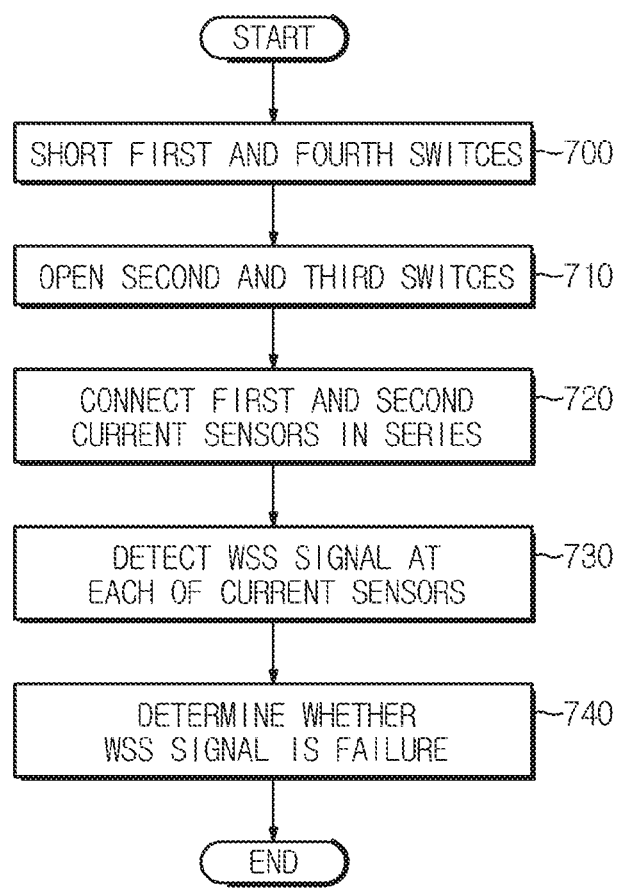
FIG. 12 is a flowchart of a control method in a normal operation of an electronic control apparatus according to embodiments of the disclosure.
Figure 13A:
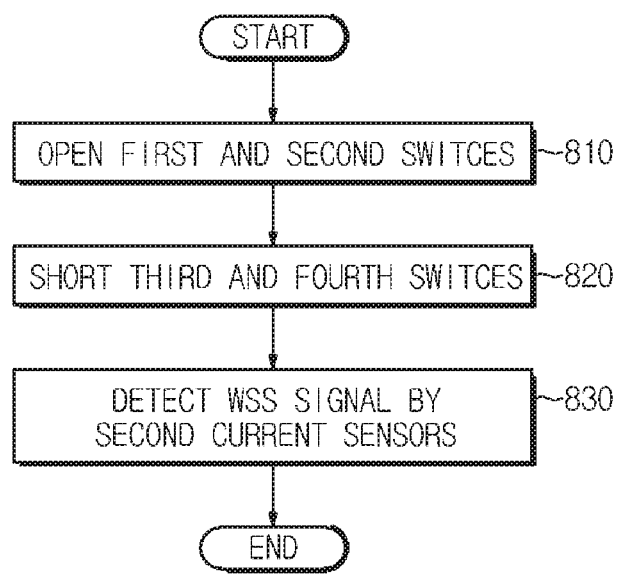
FIGS. 13A and 13B are flowcharts of a control method in a failure of an electronic control apparatus according to embodiments of the disclosure.
Figure 13B:
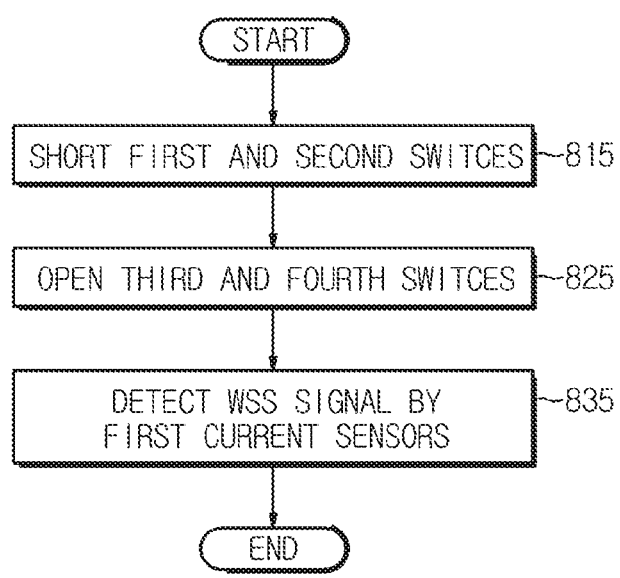

First, as illustrated in FIG. 12, when the electronic control apparatus 300 is in the normal operation, the electronic control apparatus 300 may short-circuit the first and fourth switches SW1 and SW4 (700), and open the second and third switches SW2 and SW3 (710). Particularly, the short-circuiting of the first switch SW1 and the opening of the third switch SW3 are possible as the first controller 313 transmits the control signal, and the opening of the second switch SW2 and the short-circuit of the fourth switch SW4 are possible as the second controller 323 transmits the control signal.

At this time, the opening and shorting operations of the switches SW1, SW2, SW3, and SW4 are generally performed in parallel.

Accordingly, the electronic control apparatus 300 may be configured such that the first and second current sensors 210 and 220 are connected in series (720) by the opening and shorting operations of the each of the switches SW1, SW2, SW3, and SW4, and may detect the signals of the wheel speed sensors 110 at each of the first and second current sensors 210 and 220 (730).

Accordingly, the wheel speed information processed by the first controller 313 of the first electronic control apparatus 310 and the wheel speed information processed by the second controller 323 of the second electronic control apparatus 320 are transmitted and compared with each other, and thus the failure information of the signal of the wheel speed sensor 110 may be detected (740).

However, when the failure such as a disconnection occurs in the circuit of the first electronic control apparatus 310, the signal of the wheel speed sensor 110 may be performed only with the second electronic control apparatus 320 as an auxiliary.

Particularly, FIG. 13A is a flowchart illustrating a method of performing signal detection of the wheel speed sensor 110 when the first electronic control apparatus 310 fails.

First, the electronic control apparatus 300 may open the first and second switches SW1 and SW2 (810). That is, the first controller 313 of the first electronic control apparatus 310 may transmit an open signal to the first switch SW1 and the second switch SW2.

Also, the electronic control apparatus 300 may open the third and fourth switches SW3 and SW24 (820). That is, the second controller 323 of the second electronic control apparatus 320 may transmit the open signal to the third switch SW3 and the fourth switch SW4.

The second electronic control apparatus 320 may supply the power and ground to the wheel speed sensor 110 so that the third switch SW3, the wheel speed sensor 110, the fourth switch SW4, and the second current sensor 321a may be connected in series. Accordingly, the second current sensor 321a of the second electronic control apparatus 320 may detect the signal of the wheel speed sensor 110 (830).

Next, FIG. 13B is a flowchart illustrating a method of performing signal detection of the wheel speed sensor 110 when the second electronic control apparatus 320 fails.

First, the electronic control apparatus 300 may short-circuit the first and second switches SW1 and SW2 (815). That is, the second controller 323 of the second electronic control apparatus 320 may transmit a short-circuit signal to the first switch SW1 and the second switch SW2.

Also, the electronic control apparatus 300 may short-circuit the third and fourth switches SW3 and SW24 (825). That is, the second controller 323 of the second electronic control apparatus 320 may transmit the short-circuit signal to the third switch SW3 and the fourth switch SW4.

The first electronic control apparatus 310 may supply the power and ground to the wheel speed sensor 110 so that the first switch SW1, the wheel speed sensor 110, the second switch SW2, and the first current sensor 311a may be connected in series. Accordingly, the first current sensor 311a of the first electronic control apparatus 320 may detect the signal of the wheel speed sensor 110 (835).

According to the electronic control apparatus of an aspect and the method of controlling the electronic control apparatus as described above, the safety of the passenger can be enhanced because the control of the vehicle can be stably maintained.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. An electronic control apparatus comprising:
   a first electronic control apparatus including a first signal processor configured to process a signal of a wheel speed sensor; and
   a second electronic control apparatus including:
      a second signal processor configured to process the signal of the wheel speed sensor,
      a first switching device electrically provided between the wheel speed sensor and the first signal processor, configured to allow or block the signal of the wheel speed sensor to be transmitted to the first signal processor, and
      a second switching device electrically provided between the wheel speed sensor and the second signal processor, configured to allow or block the signal of the wheel speed sensor to be transmitted to the second signal processor.

2. The electronic control apparatus according to claim 1, wherein the first electronic control apparatus further comprises a first controller configured to transmit a switching operation command of the first switching device to the second electronic control apparatus based on whether the first signal processor is in a failure state.

3. The electronic control apparatus according to claim 2, wherein, when the first signal processor is not in the failure state, the first controller is configured to transmit a turn-on switching operation command to the first switching device, and to control the first signal processor so that the first signal processor processes the signal of the wheel speed sensor.

4. The electronic control apparatus according to claim 2, wherein, when the first signal processor is in the failure state, the first controller is configured to transmit a turn-off switching operation command to the first switching device.

5. The electronic control apparatus according to claim 1, wherein the first electronic control apparatus further comprises a first controller configured to transmit a failure signal to the second electronic control apparatus based on whether the first signal processor is in a failure state, and
   wherein the second electronic control apparatus further comprises a second controller configured to control operations of the first switching device and the second switching device in response to the failure signal.

6. The electronic control apparatus according to claim 5, wherein, when the failure signal is not received, the second controller is configured to transmit a turn-on switching operation command to the first switching device, and to transmit a turn-off switching operation command to the second switching device.

7. The electronic control apparatus according to claim 5, wherein, when the failure signal is received, the second controller is configured to transmit a turn-off switching operation command to the first switching device, and to transmit a turn-on switching operation command to the second switching device.

8. The electronic control apparatus according to claim 7, wherein, when the failure signal is received, the second controller is configured to control the second signal processor to process the signal of the wheel speed sensor.

9. The electronic control apparatus according to claim 8, wherein the second controller is configured to transmit wheel speed information processed by the second signal processor to the first controller, and
   wherein the first controller is configured to calculate a wheel speed according to the wheel speed information received from the second electronic control apparatus.

10. The electronic control apparatus according to claim 1, wherein the first electronic control apparatus further comprises a first controller configured to transmit a periodic normal operation signal to the second electronic control apparatus, and
    wherein the second electronic control apparatus further comprises a second controller configured to control operations of the first switching device and the second switching device in response to receipt of the normal operation signal.

11. The electronic control apparatus according to claim 10, wherein, when the periodic normal operation signal is not transmitted from the first controller, the second controller is configured to transmit a turn-off switching operation command to the first switching device, and to transmit a turn-on switching operation command to the second switching device.

12. The electronic control apparatus according to claim 11, wherein the second controller is configured to control the second signal processor to process the signal of the wheel speed sensor, and to calculate a wheel speed according to wheel speed information processed by the second signal processor.

13. A method of controlling an electronic control apparatus that includes a first electronic control apparatus and a second electronic control apparatus, the method comprising:
    determining whether the first electronic control apparatus is malfunctioning;
    based on a failure of the first electronic control apparatus being not determined, allowing an output signal of a wheel speed sensor to be transmitted to the first electronic control apparatus, by a first switching device provided in the second electronic control apparatus and electrically provided between the wheel speed sensor and the first signal processor, and processing the output signal of the wheel speed sensor by the first electronic control apparatus; and
    based on the failure of the first electronic control apparatus being determined, blocking the output signal of the wheel speed sensor to be transmitted to the first electronic control apparatus by the first switching device, and processing the output signal of the wheel speed sensor by the second electronic control apparatus.

14. An electronic control apparatus comprising:
    a first electronic control apparatus including:
       a first switch,
       a first current sensor disposed in series between a wheel speed sensor and power by a short-circuit of the first switch, and a second switch disposed in series between the wheel speed sensor and a ground; and a second electronic control apparatus including:
 a third switch disposed in series between the power and the wheel speed sensor, and
 a second current sensor disposed in series between the wheel speed sensor and the ground by the short-circuit of a fourth switch.

15. The electronic control apparatus according to claim 14, wherein the first electronic control apparatus further comprises a first controller configured to short the first switch and open the second switch when the first electronic control apparatus is in a normal operation, and wherein the second electronic control apparatus further comprises a second controller configured to open the third switch and short the fourth switch when the second electronic control apparatus is in the normal operation.

16. The electronic control apparatus according to claim 15, wherein the first controller is configured to open the first switch and the second switch when the first electronic control apparatus is in a failure, and to transmit open signal information of the first switch and the second switch to the second electronic control apparatus, and the second controller is configured to short the third switch and the fourth switch based on the open signal information of the first switch and the second switch.

17. The electronic control apparatus according to claim 16, wherein the second controller is configured to control the second current sensor so that the second current sensor detects a signal of the wheel speed sensor.

18. The electronic control apparatus according to claim 15, wherein the second controller is configured to open the third switch and the fourth switch when the second electronic control apparatus is in a failure, and to transmit open signal information of the third switch and the fourth switch to the first electronic control apparatus, and the first controller is configured to short the first switch and the second switch based on the open signal information of the third switch and the fourth switch.

19. The electronic control apparatus according to claim 18, wherein the second controller is configured to control the second current sensor so that the second current sensor detects a signal of the wheel speed sensor.

20. The electronic control apparatus according to claim 14, wherein the electronic control apparatus is configured to compare a detected signal of the wheel speed sensor detected by the first current sensor with a detected signal of the wheel speed sensor detected by the second current sensor, and to determine a failure of the wheel speed sensor based on a comparison result.

* * * * *